358-190. OR 3,569,621 SR

[11] 3,569,621

[72] Inventor Robert W. Krug
Janesville, Wis.
[21] Appl. No. 780,053
[22] Filed Nov. 29, 1968
[45] Patented Mar. 9, 1971
[73] Assignee Zenith Radio Corporation
Chicago, Ill.

[54] TELEVISION RECEIVER CONTROL CIRCUIT
7 Claims, 1 Drawing Fig.

[52] U.S. Cl. .......... 178/7.5
[51] Int. Cl. .......... H04n 3/18
[50] Field of Search .......... 315/200, 31; 307/109; 178/7.5 (E), 6PS, 5.4

[56] References Cited
UNITED STATES PATENTS 3,202,865 8/1965 Stark, Jr. .......... 178/7.5E

*Primary Examiner*—Richard Murray
*Attorneys*—John J. Pederson and Eugene M. Cummings

ABSTRACT: A control circuit for preventing the application of accelerating potential in excess of a predetermined maximum value to the cathode-ray picture tube of a television receiver. Positive polarity pulses are amplitude related to the applied accelerating potential derived from the receiver horizontal deflection system and impressed on a neon bulb. When these pulses exceed a predetermined amplitude corresponding to the predetermined maximum value of accelerating potential, the bulb fires and causes a positive bias to be impressed on the control grid of the receiver luminance amplifier. This increases the beam current in the cathode-ray tube, heavily loading down the power supply and preventing the accelerating potential from remaining at an excessive level.

T511 Rm

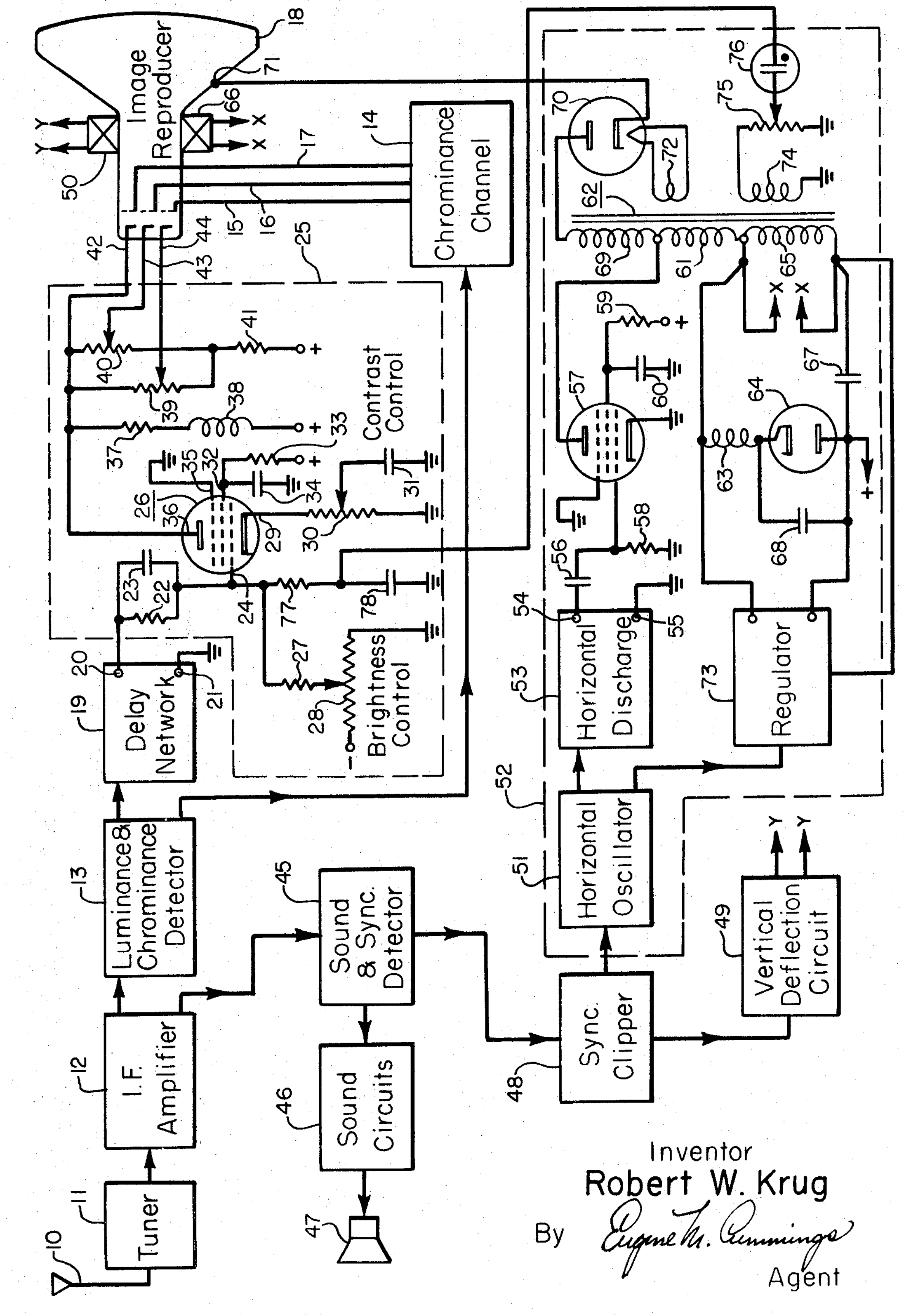
Inventor
Robert W. Krug
By
Agent

TELEVISION RECEIVER CONTROL CIRCUIT

BACKGROUND OF THE INVENTION

The present invention relates to improvements in television receiver control circuits, and more particularly, to a circuit for limiting the high voltage produced by the sweep-excited power supply of a color television receiver.

Cathode-ray tubes of the type commonly used for image reproduction in present-day color television receivers require for their operation an accelerating potential in the order of 25,000 volts. For reasons of economy it has become standard practice to generate this potential by means of a power supply excited by the output stage of the receiver horizontal deflection system. Unfortunately, such sweep-excited power supplies, while offering economy by obviating the need for expensive transformers and filters, have undesirably poor voltage regulation under the varying load conditions imposed by cathode-ray tubes with brightness level variations in the reproduced image. Accordingly, it has become standard practice to use in conjunction with such power supplies a voltage regulator for maintaining the accelerating potential substantially constant in the face of brightness variations. Such regulators have generally fallen into one of two categories; the shunt-connected type which is connected across the high voltage output of the power supply to maintain a substantially constant load on the supply at all times, and the pulsed type which is gated into conduction during a portion of the retrace interval to impose a variable load on a low voltage secondary winding on the flyback transformer.

Unfortunately, the use of either of these two types of regulators is accompanied by the possibility that the regulator will fail and the high voltage produced by the power supply will rise to an abnormally high level, limited only by the capability of the power supply components. Should this happen, there exists the possibility of damage to the power supply components as well as the possibility of the picture tube becoming a shock and radiation hazard.

SUMMARY OF THE INVENTION

Accordingly, it is a general object of the invention to provide an economical control circuit for limiting the accelerating voltage produced by a sweep-excited high voltage power supply to a predetermined maximum value.

Accordingly, a control circuit for preventing the accelerating potential applied to the cathode-ray tube of a television receiver from exceeding a predetermined value comprises a high voltage power supply for producing the accelerating potential for the cathode-ray tube, the supply being incapable of generating an accelerating potential in excess of the predetermined maximum value when the beam current in the cathode-ray tube exceeds a predetermined level. The circuit further comprises means for raising the beam current above the predetermined level when the accelerating potential exceeds the predetermined maximum value to prevent further generation of voltage in excess of the predetermined maximum value by the high voltage power supply.

BRIEF DESCRIPTION OF THE DRAWING

The features of the present invention which are believed to be novel are set forth with particularity in the appended claims. The invention, together with further objects and advantages thereof, may best be understood by reference to the following description taken in connection with the accompanying drawing, which is a detailed diagram, partially in block form and partially in schematic form, of a color television receiver incorporating a high voltage limiting circuit in accordance with the invention.

DESCRIPTION OF THE PREFERRED EMBODIMENT

With the exception of certain detailed circuitry in its luminance amplifier and horizontal deflection systems, the illustrated receiver is essentially conventional in design and accordingly only a brief description of its structure and operation need be given here. A received signal is intercepted by an antenna 10 and coupled in a conventional manner to a tuner 11, which includes the usual radio frequency amplifying and heterodyning stages for translating the signal to an intermediate frequency. After amplification by an intermediate frequency amplifier 12, the signal is applied to a luminance and chrominance detector 13 wherein luminance and chrominance information in the form of a composite video signal is derived. The chrominance component of the composite signal is amplified and demodulated in a chrominance channel 14, wherein chrominance information in the form of color difference control signals is derived for application to the blue, green and red control grids, 15, 16 and 17, respectively, of the receiver image reproducer 18, a conventional trigun tricolor cathode-ray tube.

The AC and DC luminance components of the composite signal from detector 13 are applied to a delay network 19, wherein the AC component is delayed so as to arrive at image reproducer 18 in time coincidence with the color difference control signals from the narrower-bandwidth chrominance channel 14. From output terminals 20 and 21 of the delay network, the luminance signal components are coupled via the parallel combination of a resistor 22 and a capacitor 23 to the control grid 24 of an electron-discharge amplifier device, pentode 26, contained within the receiver luminance amplifier stage 25.

The control grid of pentode 26 is also coupled by a resistor 27 to the arm of a brightness control potentiometer 28. One end terminal of this potentiometer is connected to ground and the other end terminal is connected to a negative source of unidirectional current such that a negative polarity control voltage dependent on the setting of the potentiometer appears on the arm. Resistors 27 and 22 together constitute a voltage divider network for simultaneously applying a portion of this control voltage and a portion of the DC chrominance signal component at terminals 20 and 21 to grid 24. Since the anode of pentode 26 is DC coupled to the cathodes of image reproducer 18 in a manner to be described, any variations of the DC bias applied to grid 24, whether by adjustment of potentiometer 28 or by variations in the DC component of the detected luminance signal, or in any other manner, has the effect of varying the average beam current in reproducer 18, and hence the brightness level of the reproduced image.

The cathode 29 of pentode 26 is connected to ground through the body of a contrast control potentiometer 30 which, by virtue of having its arm bypassed to ground by a capacitor 31, introduces a variable degree of AC degeneration into the cathode circuit to vary the AC gain of pentode 26, and hence the contrast of the reproduced image. The screen grid 32 of pentode 26 is connected to B+ via a screen dropping resistor 33 and is bypassed to ground at signal frequencies by a capacitor 34. The suppressor grid 35 is connected to ground and the anode 36 is connected to the receiver B+ supply by two parallel plate load circuits. The first load circuit serially comprises a resistor 37 and a shunt-peaking inductance 38, and the second circuit serially comprises parallel-connected potentiometers 39 and 40 and a resistor 41.

Both AC and DC components of the amplified luminance signal from pentode 26 appear across the two parallel plate load impedance circuits. The full luminance signal is applied directly to the red cathode 42 of image reproducer 18, and slightly less amounts of the luminance signal, as determined by the positioning of the arms of potentiometers 39 and 40 for monochromatic balance, are applied to the remaining green and blue cathodes, 43 and 44 respectively. The concurrently applied luminance and color-difference signals matrix in image reproducer 18 to produce an image having brightness, hue and color saturation characteristics corresponding to the televised image.

The amplified intermediate frequency signal from intermediate frequency amplifier 12 is also applied to a sound and sync detector 45, wherein a composite video frequency signal is derived which includes both sound and synchronizing components. The sound components of this composite signal are applied to sound circuits 46, wherein conventional sound demodulation and amplification circuitry is utilized to develop an audio output signal for application to a speaker 47. Synchronizing information, in the form of horizontal and vertical sync pulses, is separated from the composite signal by a sync clipper 48. Vertical deflection circuits 49 utilize the vertical sync pulses to generate synchronized vertical rate sawtooth-scanning signal in a vertical deflection winding 50 associated with image reproducer 18. The horizontal sync pulses from sync clipper 48 are applied to a horizontal oscillator stage 51, part of the receiver horizontal deflection system 52.

Included in oscillator stage 51 is appropriate phase-detector and reactance control circuitry for producing a horizontal rate sine wave output signal synchronized to the received television transmission. A horizontal discharge stage 53 amplifies and conditions this signal to develop a drive signal at its output terminals 54 and 55 which resembles a sawtooth during scan intervals and a steep negative-polarity pulse during retrace intervals. This drive signal is coupled by a capacitor 56 to the control grid of the horizontal output tube, pentode 57. The control grid of pentode 57 is returned to ground by a resistor 58, and the screen grid is connected to B+ by a resistor 59 and bypassed to ground at signal frequencies by a capacitor 60.

Pentode 57, which functions as a conventional reaction-scanning type output stage, receives operating power via the primary winding 61 of a conventional horizontal flyback transformer 62, an inductor 63 and a damper diode 64. Output from this stage is derived by means of a second primary winding 65, across which the horizontal deflection winding 66 associated with image reproducer 18 is connected and across which diode 64 is effectively shunt-connected by inductor 63 and a capacitor 67. A capacitor 68 is shunt-connected across diode 64 to suppress any radio frequency spurious emission generated therein.

In its general aspects, the operation of horizontal deflection system 52 is well known to the art. The drive signal applied to the control grid of pentode 57 initiates conduction in that device at approximately the middle of each horizontal scanning cycle, causing a linear increase in current in primary winding 61, and hence windings 65 and 66, until a maximum is reached corresponding to the electron beam being at the right edge of the raster. At this point the drive signal applied to the control grid of pentode 57 suddenly becomes negative and drives that device sharply into cutoff. The ensuing sudden termination of current flow through winding 61 causes the magnetic field surrounding that winding and windings 65 and 66 to collapse, initiating a harmonic oscillation of approximately 95 kHz. in the equivalent tuned circuit consisting of those windings, capacitors 65 and 66 and the various distributed stray and fixed capacities of the deflection circuit.

The current through deflection winding 66 reverses during the first quarter cycle of the induced oscillation and rises to a maximum in the reverse direction at the end of the second quarter cycle of oscillation. This rapid reversal of current flow constitutes the flyback or retrace interval during which the scanning beam of image reproducer 18 is rapidly returned from the right edge to the left edge of the raster. The counter-EMF developed across winding 66 as a result of the sudden current reversal during the first portion of the retrace interval is applied to diode 64 through inductor 63 and capacitor 67. During the retrace interval this potential renders the cathode of diode 64 positive with respect to its anode, so that the diode does not conduct and has no damping effect on the oscillation. However, at the end of the first half-cycle of oscillation, the polarity of the signal applied to diode 64 is reversed and the diode conducts, damping out subsequent oscillations and causing a linearly decaying current in deflection winding 66. This sweeps the electron scanning beam from the left edge to the center of the raster, at which point pentode 57 again becomes conductive by virtue of the applied drive signal to complete the scanning cycle.

The sudden termination of current flow at the beginning of each retrace interval also generates a harmonic oscillation in a high voltage tertiary winding 69 contained on transformer 62. This oscillation is peak rectified by a high voltage rectifier 70 which, in conjunction with the internal capacity of image reproducer 18, develops an accelerating potential of approximately 25,000 volts on the ultor electrode 71 of image reproducer 18. A secondary winding 72 is included on transformer 62 for energizing the heater of high voltage rectifier 70.

A regulator stage 73 of the pulse-controlled type and similar to that described and claimed in the copending application of Stanley Bart, Ser. No. 567,466, assigned to the present assignee, is included in the horizontal deflection system 52 for regulating the accelerating potential applied to ultor electrode 71. Basically, this stage functions by variably loading secondary winding 65, and hence tertiary winding 69 through mutual inductance, during the first quarter cycle of the induced harmonic oscillation. The effect of increased loading is to reduce the amplitude of the initial positive polarity excursion at the beginning of retrace, thus reducing the voltage developed at ultor electrode 71.

The degree of loading imposed by regulator 73 is directly dependent on the magnitude of the boost voltage developed at the juncture of winding 65 and capacitor 67, which in turn is directly related to the accelerating potential applied at ultor electrode 71. Thus, a feedback loop is established which serves to automatically maintain the accelerating potential applied to image reproducer 18 substantially constant at a predetermined value. To prevent regulator 73 from adversely affecting the width of the reproduced image, the horizontal-rate wave signal generated by horizontal oscillator 51 is utilized as a gating control signal to allow the regulator to load winding 65 only during a small portion of the first half of the retrace interval.

To assure proper operation of regulator 73, it is necessary that the circuitry of horizontal deflection stage 52, and in particular pentode 57 and the turns ratios of the various windings to transformer 62, be selected to produce an accelerating voltage on ultor electrode 71 in excess of the desired nominal value in the absence of a loading effect imposed by regulator 73. In practice, this voltage may be in the order of from 28 to 30 kilovolts, substantially in excess of the 25 kilovolt desired maximum value. It will be appreciated that absent any additional precautions, any failure of regulator 73, whether it be an open heater, a breakdown within the tube, or a failure of gating pulses, will result in an overvoltage condition.

In accordance with the invention, the receiver includes a novel voltage-limiting circuit to prevent such overvoltage conditions. The circuit comprises an additional secondary winding 74 on flyback transformer 62, a potentiometer 75 shunt connected across that winding, and a neon bulb 76 connected from the arm of the potentiometer to the control grid of luminance amplifier pentode 26 via a series isolation resistor 77. A capacitor 78 is connected from the juncture of isolation resistor 77 and neon bulb 76 to develop in conjunction with the bulb a DC voltage suitable for controlling pentode 26.

Under normal operating conditions, potentiometer 75 is adjusted so that the positive retrace pulses developed across winding 74 are insufficient to fire neon bulb 76, and pentode 26 operates in a normal manner. However, when the high voltage rises beyond a predetermined maximum threshold value, as would be the case if regulator stage 73 were to completely fail, the pulses rise to a level sufficient for firing neon bulb 76. This generates a positive polarity voltage across capacitor 78, which voltage is applied to the control grid of pentode 26 via isolation resistor 77 to overcome the negative bias ordinarily existing on that grid by virtue of brightness control potentiometer 28 and the DC coupling provided to luminance detector 13 by resistor 22 and delay network 19. This drives pentode 26 into heavy conduction, which reduces its anode voltage and hence the voltage on the three DC-coupled cathodes of image reproducer 18. As a result, the beam current in all three guns increases, loading the power supply so heavily that it cannot sustain the excessive accelerating voltage. During this period the reproduced image suffers severe degradation in the form of blooming and poor focus, likely causing a viewer to discontinue watching the receiver and to call a serviceman.

The proposed circuit requires only a few additional inexpensive components, and therefore is especially well suited for mass production in today's highly competitive consumer television market. Furthermore, the circuit is easy to adjust, offers good stability under conditions of varying line voltage and ambient temperature, and can be added to a television chassis with virtually no changes in existing circuitry. It will be appreciated that other arrangements are possible for increasing beam current; for instance, a transistor could be employed to open the negative bias connection to the brightness potentiometer, or to impose a reduced negative bias directly on the cathode-ray tube.

The following are a set of component values for the circuit which have been found to provide satisfactory operation in accordance with the invention. It will be appreciated that these values are given by way of example, and that other values may be substituted therefor without departing from the principles of the present invention.

| | |
|---|---|
| **R22** | 390,000 ohms, ½watt |
| **R27** | 470,000 ohms, ½watt |
| **R28** | 250,000 ohms – linear taper |
| **R30** | 500 ohms – linear taper |
| **R75** | 10,000 ohms – linear taper |
| **R77** | 100,000 ohms, ½watt |
| **C23** | .1 microfarad |
| **C31** | 200 microfarads, **25VDC** |
| **C78** | .01 microfarad |
| **V26** | **12HL7** |
| **V76** | NE2H |

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. In a control circuit for preventing the accelerating potential applied to the cathode-ray tube of a television receiver from exceeding a predetermined maximum value:

a high voltage power supply for producing said accelerating potential for said cathode-ray tube, said supply being incapable of generating an accelerating potential in excess of said predetermined maximum value when the beam current in said cathode-ray tube exceeds a predetermined level;

a regulator associated with said high voltage power supply for normally maintaining said accelerating potential at a predetermined level below said predetermined maximum value;

means for sensing variations in said accelerating potential to develop a control effect; and means coupled to said sensing means and responsive to said control effect for raising said beam current above said predetermined level when said accelerating potential exceeds said predetermined maximum value in the event of failure of said regulator to prevent further generation of voltage in excess of said predetermined maximum value by said high voltage power supply.

2. A control circuit as described in claim 1 wherein are further included:

means including a luminance amplifier for controlling the beam current in said cathode-ray tube, and hence the brightness of the image reproduced thereby, in response to luminance information derived from a received television transmission; and wherein said means for raising said beam current above the predetermined level includes coupled to said sensing means in response to the said control effect for overloading said luminance amplifier.

3. A control circuit as described in claim 2 wherein said luminance amplifier includes an electron-discharge device and said means for raising said beam current comprises means for changing the operating bias applied to said device.

4. A control circuit as described in claim 3 wherein said electron-discharge device has input, output and control electrodes, said output electrode is direct-current coupled to said image reproducer, and said means for changing the bias applied to said device changes the bias applied to said control electrode.

5. A control circuit as described in claim 4 wherein said output electrode is an anode, said input electrode is a cathode and said control electrode is a grid.

6. A control circuit as described in claim 4 wherein said means for changing the bias applied to said control electrode comprises:

a source of pulses amplitude-dependent on the magnitude of said accelerating potential and having a predetermined level corresponding to said predetermined maximum value of said accelerating potential;

normally open switch means coupled to said pulse source and becoming closed in response to said pulses exceeding said predetermined level;

means coupled between said switch device and said luminance amplifier for developing from pulses translated through said switch device a direct-current control voltage; and means for applying said control voltage to said luminance amplifier to increase said beam current above said predetermined level.

7. A control circuit as described in claim 6 wherein said receiver has a reaction-scanning type horizontal deflection system including a flyback transformer, said source comprises a winding on said horizontal flyback transformer, and said switch device comprises a neon bulb.